(12) United States Patent
Ueno

(10) Patent No.: US 9,908,384 B2
(45) Date of Patent: Mar. 6, 2018

(54) VEHICLE AIR CONDITIONING APPARATUS

(71) Applicant: Valeo Japan Co., Ltd., Saitama (JP)

(72) Inventor: Shota Ueno, Saitama (JP)

(73) Assignee: Valeo Japan Co., Ltd., Saitama (JP)

( * ) Notice: Subject to any disclaimer, the term of this patent is extended or adjusted under 35 U.S.C. 154(b) by 99 days.

(21) Appl. No.: 14/918,029

(22) Filed: Oct. 20, 2015

(65) Prior Publication Data

US 2016/0114648 A1     Apr. 28, 2016

(30) Foreign Application Priority Data

Oct. 22, 2014   (JP) .................................. 2014-215385

(51) Int. Cl.
*B60H 1/00*     (2006.01)
*B60H 1/32*     (2006.01)

(52) U.S. Cl.
CPC ..... *B60H 1/00564* (2013.01); *B60H 1/00028* (2013.01); *B60H 1/00514* (2013.01);
(Continued)

(58) Field of Classification Search
CPC .............. B60H 1/00564; B60H 1/0028; B60H 1/00514; B60H 2001/00085;
(Continued)

(56) References Cited

U.S. PATENT DOCUMENTS 6,386,966 B1    5/2002  Kuwayama et al.
2006/0242984 A1*  11/2006  Kang ................... B60H 1/3233
                                                              62/285

(Continued)

FOREIGN PATENT DOCUMENTS

EP      1101640 A2    5/2001
GB      2456338 A     7/2009
(Continued)

OTHER PUBLICATIONS

The First Office Action issued in corresponding Chinese Application No. 201510690807.7, dated Jul. 5, 2017 (12 pages).
(Continued)

*Primary Examiner* — Mohammad M Ali
(74) *Attorney, Agent, or Firm* — Osha Liang LLP

(57) ABSTRACT

A vehicle air conditioning apparatus in which a noise caused by burble is reduced is provided. The vehicle air conditioning apparatus includes: a case having an air channel in an interior thereof; a blower configured to supply blown air to the air channel, the case includes a cylindrical portion and an enlarged portion continued from the cylindrical portion on a downstream side and having a cross-sectional area larger than a cross-sectional area of the cylindrical portion, the enlarged portion includes a projecting wall having a wall surface projecting outward of the air channel, the projecting wall includes at least one projection projecting inward of the air channel, and a top portion of the projection is in contact with a side surface of an virtual cylinder, which is formed by extending the inner wall surface of the cylindrical portion in the virtually extended toward the downstream, or is provided on the projecting wall side with respect to the side surface of the virtual cylinder.

6 Claims, 4 Drawing Sheets

(52) U.S. Cl.
CPC .............. *B60H 2001/006* (2013.01); *B60H 2001/00085* (2013.01); *B60H 2001/00092* (2013.01)

(58) Field of Classification Search
CPC .... B60H 2001/00092; B60H 2001/006; B60H 1/00; B60H 1/26; B60H 1/12
USPC .................................................. 62/296, 244
See application file for complete search history.

(56) References Cited

U.S. PATENT DOCUMENTS

| | | | |
|---|---|---|---|
| 2011/0009043 A1* | 1/2011 | Nanaumi | B60H 1/00564 454/121 |
| 2012/0057972 A1* | 3/2012 | Kim | B60H 1/00507 415/204 |
| 2012/0168117 A1 | 7/2012 | Jairazbhoy et al. | |

FOREIGN PATENT DOCUMENTS

| | | |
|---|---|---|
| JP | H10-129246 A | 5/1998 |
| JP | 2001-71737 A | 3/2001 |
| JP | 2001158217 A | 6/2001 |
| JP | 2001-180255 A | 7/2001 |
| JP | 2004-262299 A | 9/2004 |
| JP | 2005-335508 A | 12/2005 |
| JP | 2006168656 A | 6/2006 |
| JP | 2009166714 A | 7/2009 |
| JP | 2011122517 A | 6/2011 |
| JP | 2013052808 A | 3/2013 |
| WO | 01/40003 A1 | 6/2001 |

OTHER PUBLICATIONS

Notification of Reason for Refusal issued in corresponding Japanese Application No. 2014-215385, dated Dec. 5, 2017 (7 pages).

* cited by examiner

VEHICLE AIR CONDITIONING APPARATUS

BACKGROUND OF THE INVENTION

1. Field of the Invention

The present invention relates to a vehicle air conditioning apparatus.

2. Description of Related Art

Vehicle air conditioning apparatuses include a transverse-mounted type having a layout in which a blower unit having a blower and a heat exchanging unit having a cooling heat exchanger are arranged in a lateral direction of a vehicle (see JP-A-2006-168656, for example) and a vertically-mounted type having a layout in which the blower unit and the heat exchanging unit are arranged in a vertical direction (see JP-A-2001-158217, for example).

In the vehicle air conditioning apparatus of the transverse-mounted type, a technology for adjusting an air-velocity distribution of air flowing into a heat exchanger by providing projecting portions which project perpendicularly to an air-inflow surface on an opposed wall surface which opposes the air-inflow surface of the heat exchanger is disclosed (for example, see JP-A-2009-166714). A technology for uniformizing an air-velocity distribution on a downstream side of a diffuser portion by providing a projection for generating vertical whirl on the diffuser portion having a suddenly-enlarged inflow channel is disclosed (see JP-A-2011-122517, for example).

A technology for reducing an aerodynamic sound generating by air turbulence by providing a plurality of projections on the wall surface of the air channel is disclosed (for example, see JP-A-2013-52808, for example).

When a cross-sectional area of an air channel is enlarged, burble which is an air flow separated from an inner wall surface of a case is generated. The burble forms a whirl flow, and the whirl flow may cause a noise. In JP-A-2009-166714, JP-A-2011-122517, and JP-A-2013-52808, technologies for adjusting the air-velocity distribution or reducing an aerodynamic sound by providing projections on the inner wall surface of the case are disclosed. However, a technology for reducing the noise caused by the burble is not disclosed.

SUMMARY OF THE INVENTION

It is an object of the invention to provide a vehicle air conditioning apparatus in which a noise caused by burble is reduced.

A vehicle air conditioning apparatus of the invention including: a case having an air channel in an interior thereof; a blower configured to supply blown air to the air channel, wherein the case includes a cylindrical portion and an enlarged portion continued from the cylindrical portion on a downstream side and having a cross-sectional area larger than a cross-sectional area of the cylindrical portion, the enlarged portion includes a projecting wall having a wall surface projecting outward of the air channel, the projecting wall includes at least one projection projecting inward of the air channel, and a top portion of the projection is in contact with a side surface of a virtual cylinder, which is formed by extending an inner wall surface of the cylindrical portion virtually toward the downstream, or is provided on a projecting wall side with respect to the side surface of the virtual cylinder.

Preferably, in the vehicle air conditioning apparatus of the present invention, the projection is a plate-shaped projection, and a width direction of the plate-shaped projection is a direction intersecting the direction of the air flow. The formation of a whirl flow may be prevented further reliably.

Preferably, the vehicle air conditioning apparatus has a layout in which a blower unit having the blower and a heat exchanging portion having a cooling heat exchanger are transversely mounted, the cylindrical portion is a duct portion provided between the blower unit and the heat exchanging portion, the cooling heat exchanger is arranged so that a direction of a normal line of a sucking surface intersects a direction of a flow of a blown air from the duct portion, the enlarged portion is a direction changing portion configured to change the direction of the flow of the blown air from the duct portion to a direction toward the sucking surface of the cooling heat exchanger, the projecting wall is a bottom wall of the direction changing portion which forms a space by projecting outward of the air channel, and the space is a retaining portion of condensed water generating in the cooling heat exchanger. In the vehicle air conditioning apparatus of the transverse-mounted type, the noise can be reduced.

Preferably, the projection has a gap with respect to a sucking surface or a supporting wall configured to support the cooling heat exchanger in the air channel. Condensed water generated in the cooling heat exchanger may be drained further efficiently.

Preferably, the heat exchanging portion includes a drain port configured to drain the condensed water from the case and provided at a bottom portion in which the cooling heat exchanger is to be arranged, and the projection is a plate-shaped projection, and a wall surface on which the plate-shaped projection is arranged forms a surface inclined downwardly toward the drain port. Condensed water generated in the cooling heat exchanger may be drained further efficiently.

Preferably, when a surface closer to the cylindrical portion out of front and back surfaces of the plate-shaped projection is defined as a first plate surface, the back surface of the first plate surface is defined as a second plate surface, a point formed by an end point of an intersecting line between the second plate surface and an inner surface of the projecting wall located on the sucking surface side of the plate-shaped projection projecting onto a given horizontal plane H is defined as a point A, a point formed by projecting an end point located on the opposite side of the sucking surface of the plate-shaped projection projecting onto the horizontal plane H is defined as a point B, a point formed by projecting the drain port onto the horizontal plane H is defined as a point C, and points extending downward from the point A, the point B, and the point C onto an extended surface of the sucking surface are defined respectively as a point A', a point B', and a point C', the point A' is preferably closer to the point C' than to the point B', or the point A', the point B' and the point C' overlap with each other. Condensed water generated in the cooling heat exchanger may be drained further efficiently.

Advantageous Effects of Invention

The invention provides a vehicle air conditioning apparatus in which a noise caused by burble is reduced.

DESCRIPTION OF EMBODIMENTS

Referring now to the attached drawings, an embodiment of the invention will be described. The mbodiment described below is an example of the invention, and the invention is not limited to the following embodiment. In the specification and the drawings, components having identical reference signs are the same components. Various modifications may be made for achieving advantageous effects of the invention.

Figure 1:
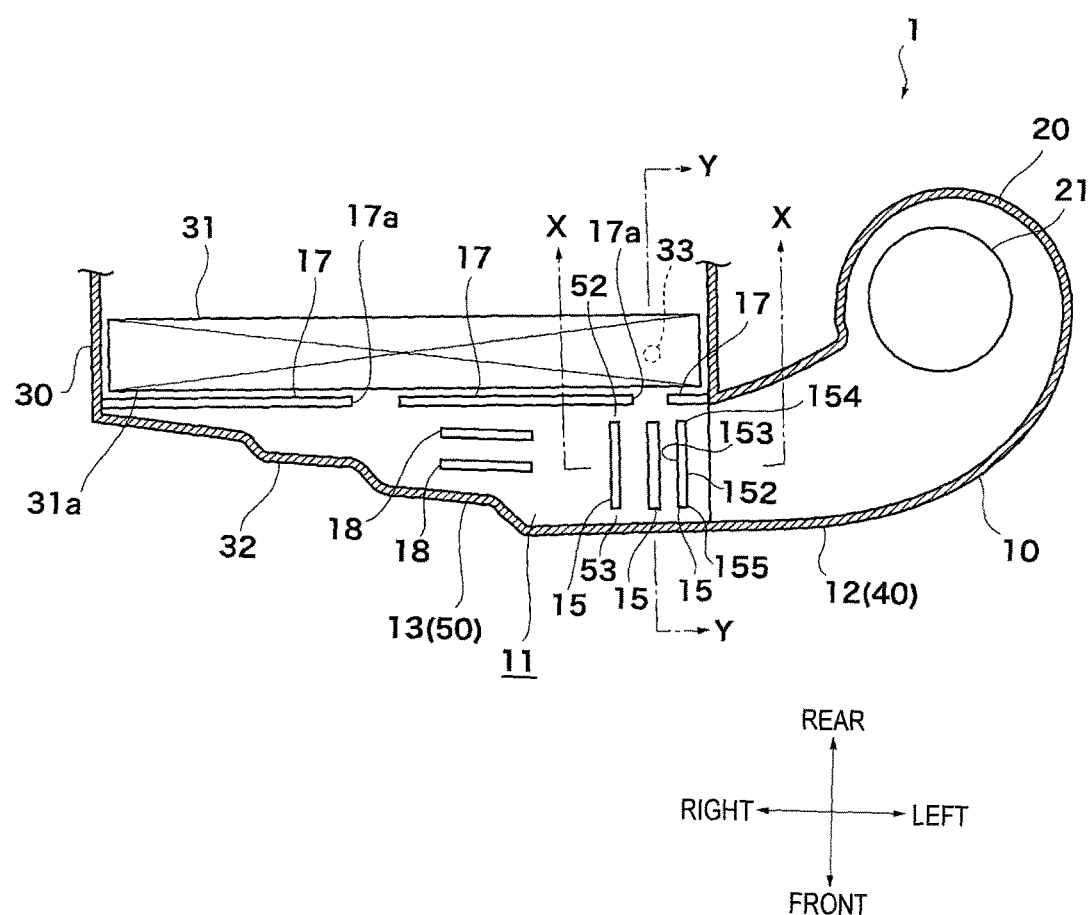
FIG. 1 is a schematic cross-sectional view of a portion of a vehicle air conditioning apparatus.
Figure 2:
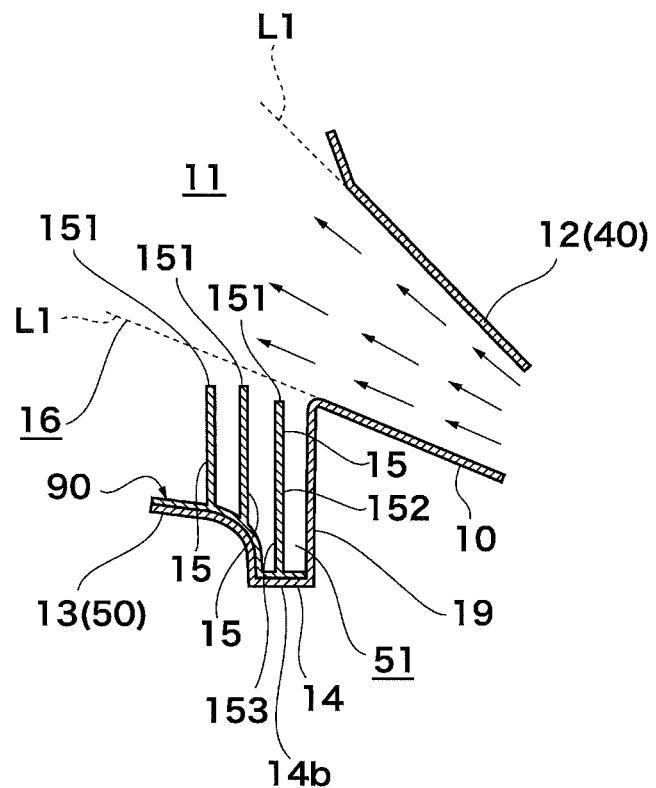
FIG. 2 is a drawing illustrating an end surface of FIG. 1 taken along a line X-X.

FIG. 1 is a schematic cross-sectional view of a portion of a vehicle air conditioning apparatus. FIG. 2 is an end view of FIG. 1 taken along a line X-X. As illustrated in FIG. 1, in a vehicle air conditioning apparatus 1 of an embodiment including: a case 10 having an air channel 11 in the interior thereof; and a blower 21 configured to supply blown air to the air channel 11, the case 10 includes a cylindrical portion 12 and an enlarged portion 13 continued from the cylindrical portion 12 on a downstream side and having a cross-sectional area larger than a cross-sectional area of the cylindrical portion 12 as illustrated in FIG. 2, the enlarged portion 13 includes a projecting wall 14 having a wall surface projecting outward of the air channel 11, the projecting wall 14 includes at least one projection 15 projecting inward of the air channel 11, and a top portion 151 of the projections 15 is on a projecting wall 14 side with respect to a side surface of a virtual cylinder 16 formed by virtually extending the inner wall surface of the cylindrical portion toward the downstream.

The vehicle air conditioning apparatus 1 of the embodiment is called as HVAC (Heating, Ventilation, and Air Conditioning), and includes a blower unit 20, a heat-exchanging portion 30, and a wind distributing portion (not illustrated). The vehicle air conditioning apparatus 1 includes an introduction port (not illustrated) configured to take air outside the case 10 into the case 10, and is connected to a blowing port (not illustrated) configured to blow out air in the case 10 toward a vehicle cabin directly or indirectly via a duct. The introduction port is, for example, an outside air introduction port configured to introduce air outside the vehicle or an internal air introduction port configured to introduce air in a vehicle chamber. The blowing port is, for example, a blowing port for ventilation, the blowing port for defrost or a foot blowing port. The case 10 forms a contour of the vehicle air conditioning apparatus 1. The air channel 11 is an internal space of the case 10.

The blower unit 20 has a blower 21 in the interior thereof. The blower 21 supplies the blown air to the air channel 11 by sucking air from the introduction port (not illustrated) and sending toward downstream. The blower 21 includes a centrifugal multi-blade fan (not illustrated) such as a sirocco fan or a turbo fan, and a motor (not illustrated) configured to drive the fan.

The heat-exchanging portion 30 includes a cooling heat exchanger 31 in the interior thereof. The cooling heat exchanger 31 is arranged downstream of the blower 21 to form part of a refrigerating cycle (not illustrated) to allow coolant to circulate therein, thereby the blown air is cooled as needed. The cooling heat exchanger 31 may be fixed by being supported by a supporting wall 17, or may be fixed in a state in which a lower portion of the cooling heat exchanger 31 is stored in a recess (not illustrated) provided on the case 10. The supporting wall 17 preferably includes a notch 17a so as not to hinder the flow of the condensed water generated in the cooling heat exchanger 31 into a drain port 33.

The cylindrical portion 12 has an inner wall surface having a streamline shape. The term "streamline shape" means a shape having no substantial depression and projection on the inner wall surface thereof, so that the blown air flows along an inner wall surface of the case 10, and probability of occurrence of whirl and turbulence which may result in a noise is low. The enlarged portion 13 continues from the cylindrical portion 12 on the downstream side and, as illustrated in FIG. 2, has a cross-sectional area larger than a cross sectional area of the cylindrical portion 12. In portion of the air channel where the cross-sectional area is increased, the flow of air is separated from the inner wall surface of the case 10, which may cause a whirl flow which may cause a noise.

The enlarged portion 13 includes a projecting wall 14 having a wall surface projecting outward of the air channel 11 relatively with respect to the periphery of the wall surface of the enlarged portion 13 as illustrated in FIG. 2. The configuration "projecting outward of the air channel 11" is to cause the cross-sectional surface of the air channel 11 to be enlarged, and is to cause the inner wall surface of the cylindrical portion 12 to project in a direction away from the side surface of the virtually cylinder 16 extending virtually toward the downstream. In FIG. 2, a mode in which the projecting wall 14 projects to the downward side of the air channel 11 is shown as an example.

Since the projecting wall 14 is projected from the air channel 11, a shoulder 19 is formed on the inner wall surface of the case 10. The blown air flowed in the cylindrical portion 12 is separated from the inner wall surface of the case 10, so that burble is generated. The invention contributes to reduce the noise by providing the projection 15 in an area where the burble is generated to cause the burble to form a whirl flow.

As illustrated in FIG. 2, the projection 15 projects from an inner wall surface of the projecting wall 14 inward of the air channel 11. The direction inward of the air channel 11 corresponds to a direction toward a side surface of the virtually cylinder 16 formed by virtually extending an inner wall surface of the cylindrical portion 12 downward, for example. The projection 15 may be formed integrally with the projecting wall 14 or may be formed separately from the projecting wall 14. In the case where the projection 15 is formed integrally with the projecting wall 14, the projection 15 projects directly from the inner wall surface of the projecting wall 14. In the case where the projection 15 is a separate member from the projecting wall 14, as illustrated in FIG. 2, a mold 90 provided with the projections 15 is arranged on an inner wall surface of the projecting wall 14, and the projection 15 projects indirectly from the inner wall surface of the projecting wall 14. When the projection 15 is integral with the projecting wall 14, the projection 15 preferably extends along a direction of separation of a metal die at the time of forming the case 10 by injection molding. When the projection 15 is formed by the injection molding, the material of the projection 15 is not specifically limited as long as it is a resin used for the injection molding. However, polypropylene, polyethylene, polystyrene, or ABS resin are used, for example. From a viewpoint that the material of the projection 15 needs to resist a temperature environment of a vehicle in which an air-conditioning apparatus is arranged, needs to be waterproof, and needs not to cause odor or powder, polypropylene, or EPDM (ethylene propylene diene monomer) may be used. When the projecting wall 14 is mounted on the bottom portion of the case 10 in a posture mounted on a vehicle, the projection 15 is preferably at an angle within ±15° with respect to the vertical direction, and more preferably extends in the vertical direction.

The top portion 151 of the projections 15 is, as illustrated in FIG. 2, on the projecting wall 14 side with respect to the side surface of the virtual cylinder 16 formed by virtually extending the inner wall surface of the cylindrical portion 12 toward the downstream. The top portion 151 of the projections 15 may come into contact with the side surface of the virtual cylinder 16 formed by virtually extending the inner wall surface of the cylindrical portion 12 toward the downstream. If the top portion 151 of the projection 15 projects into the virtual cylinder 16, the blown air flowed out from the cylindrical portion 12 hits the projection 15, and a reduction of the amount of the blown air may result. There may be a case where the turbulence occurs and consequently a noise results. The virtual cylinder 16 is a cylinder formed by an extended line L1 of a bus line on the inner wall surface of the cylindrical portion 12. The shape of the virtual cylinder 16 is a cylindrical shape if the cylindrical portion 12 has a cylindrical shape, and is a square cylindrical shape if the cylindrical portion 12 has a square cylindrical shape. In the case where the cylindrical portion 12 has a tapered shape whereof a cross-sectional area is increased or reduced gradually toward the downstream, the shape of the virtual cylinder 16 has a tapered shape which is an extension of the tapered shape of the cylindrical portion 12. The virtual cylinder 16 corresponds to a flow tube that the blown air flowed out from the cylindrical portion 12 forms. The flow tube may be obtained, for example, by a CFD (Computational Fluid Dynamics) analysis.

The shape of the projection 15 is, for example, a plate shape and a column shape. The plate shape means a shape in which a length in a width direction is longer than a length in a thickness direction, and includes a state in which both of a front surface and a rear surface are flat (illustrated in FIG. 1 and FIG. 2) or a state in which one or both of the front surface or the rear surface are curved surfaces (not illustrated). A width direction of the plate-shaped projection 15, for example, corresponds to a long side direction when a lateral cross-sectional shape of the plate-shaped projection 15 is a rectangular shape as illustrated in FIG. 1, and corresponds to a long-axis direction when the lateral cross-sectional shape of the plate-shaped projection 15 has an oblong shape (not illustrated). The direction of thickness of the plate-shaped projection 15 means a direction orthogonal to the width direction. A column shape includes, for example, a circular cylindrical shape, a conical shape, a square column shape, or a pyramid shape.

In the vehicle air conditioning apparatus of the embodiment, the projection 15 is a plate-shaped projection, and the width direction of the plate-shaped projection 15 is preferably a direction intersecting the direction of the air flow. The formation of the whirl flow may be prevented further reliably. An angle formed between the width direction of the plate-shaped projection 15 and a direction of the air flow is preferably 90°±15°, and more preferably, 90°.

The number of the projections 15 is not specifically limited. In FIG. 1 and FIG. 2 illustrate a mode in which three of the projections 15 are provided, for example. In the case where a plurality of the projections 15 are arranged, the plurality of the projections 15 are preferably arranged in line in the fore-and-aft direction when viewed from the cylindrical portion 12 side. For example, when the plate-shaped projections are arranged in line in the fore-and-aft direction as the projections 15, the distance between the plate-shaped projections 15 is preferably shorter than the length of the plate-shaped projection 15 in the width direction. The plurality of projections 15 may all have the same shape, or may have shapes different from each other. The positions of the top portions 151 of the projections 15 may be either one of modes being in contact with the side surface of all of the virtual cylinder 16 (not illustrated), having the same height from the horizontal plane (not illustrated), separating from the virtual cylinder 16 more as it goes toward the cylindrical portion 12 (not illustrated), and separating from the virtual cylinder 16 as it goes away from the cylindrical portion 12 (see FIG. 2). In this embodiment, the positions of the top portions 151 of the projections 15 preferably separate from the virtual cylinder 16 as it goes away from the cylindrical portion 12. Since the blown air flowed out from the cylindrical portion 12 is diffused over a larger range outward from the extended line L1 as it goes away from the cylindrical portion 12, the amount of the blown air which hits against the projections 15 may be reduced by configuring in such a manner that the positions of the top portions 151 of the projections 15 separate more from the virtual cylinder 16 as it goes away from the cylindrical portion 12, and hence the reduction in amount of air flow may be suppressed. Hitting of the blown air against the projection 15 prevents such an event that the air flow becomes turbulent and hence a noise is generated.

A mechanism of reduction of noise by the projections 15 will be described. As illustrated in FIG. 2, the projecting wall 14 forms the shoulder 19 on the inner wall surface of the case 10. The blown air flowed out from the cylindrical portion 12 is separated from the inner wall surface of the case 10 at the shoulder 19. If there is no projection 15, the burble separated from the inner wall surface flows reversely with respect to a flow of normal blown air flowing from upstream to downstream of the air channel, and a whirl flow is formed in the space 51 formed by the projecting wall 14. This whirl flow may cause a noise. In contrast, with the provision of the projections 15 on the projecting wall 14, a flow of the blown air flowed in the reverse direction is prevented from hitting against the projections 15 and hence forming a whirl flow. Consequently, the noise may be reduced.

Referring now to FIG. 1 and FIG. 2, a specific example will be described. In the vehicle air conditioning apparatus of this embodiment, for example, the vehicle air conditioning apparatus 1 has a layout in which the blower unit 20 having the blower 21 and the heat-exchanging portion 30 having the cooling heat exchanger 31 are arranged transversely as illustrated in FIG. 1, the cylindrical portion 12 is a duct portion 40 provided between the blower unit 20 and the heat-exchanging portion 30, the cooling heat exchanger 31 is arranged in such a manner that a direction of a normal line of a sucking surface 31a intersects the direction of the flow of the blown air from the duct portion 40, the enlarged portion 13 is a direction changing portion 50 configured to change the direction of the flow of the blown air from the duct portion 40 to a direction toward the sucking surface 31a of the cooling heat exchanger 31, the projecting wall 14 is a bottom wall of the direction changing portion 50, as illustrated in FIG. 2, a space 51 is formed by the bottom wall projecting outward of the air channel 11, and the space 51 is a retaining portion of condensed water generating in the cooling heat exchanger 31. In the vehicle air conditioning apparatus 1 of the transverse-mounted type, the noise can be reduced.

The duct portion 40 forms a cylindrical air channel 11 for flowing the blown air sent from the blower 21 to the downstream. In FIG. 2, a mode that the duct portion 40 is directed upward as it goes downstream is shown. The invention, however, is not limited thereto, and, for example, a mode in which the duct portion 40 is directed downward as it goes downward or a mode in which the duct portion 40 is arranged horizontally is also applicable.

The direction changing portion 50 forms the air channel 11 between the sucking surface 31a of the cooling heat exchanger 31 and an opposed wall 32 opposing the sucking surface 31a as illustrated in FIG. 1. When the direction of the flow of the blown air from the duct portion 40 is a direction from the left to the right of the vehicle, for example, a direction toward the sucking surface 31a of the cooling heat exchanger 31 is a direction toward the rear side of the vehicle. The opposed wall 32 may be formed into a step shape which approaches the sucking surface 31a as it goes away from the duct portion 40 to uniformize the air-velocity distribution, for example. The direction changing portion 50 may be provided with a plate-shaped rectifying guide 18 which is arranged in parallel with the sucking surface 31a as needed.

The projecting wall 14 illustrated in FIG. 2 has a form in which a wall of the bottom portion of the direction changing portion 50 projects outward of the air channel 11 so as to be adjacent to a boundary between the duct portion 40 and the direction changing portion 50. However, the invention is not limited thereto, and a portion of the wall of the bottom portion of the direction changing portion 50 apart from the duct portion 40 may project. A surface area of the blowing port (not illustrated) blowing the blown air out from the blower unit 20 toward the duct portion 40 is smaller than a surface area of the sucking surface 31a of the cooling heat exchanger 31. In order to make the vehicle air conditioning apparatus 1 fulfill the cooling performance sufficiently, the blown air preferably circulates the entire area of the sucking surface 31a. Therefore, in the duct portion 40, the cross-sectional area of the air channel 11 is preferably enlarged as it goes toward the downstream. However, a space for arranging the vehicle air conditioning apparatus 1 is limited, and enlargement of the cross-sectional area of the air channel 11 in the duct portion 40 is limited. In such a circumstance, if the projecting wall 14 is not provided, the case 10 has a configuration that the case 10 covers an area of the sucking surface 31a of the cooling heat exchanger 31 outside the virtual cylinder 16, so that the circulation of the blown air to the cooling heat exchanger 31 is partly hindered and hence the vehicle air conditioning apparatus 1 may not fulfill the cooling performance sufficiently. However, with the provision of the projecting wall 14 while making the vehicle air conditioning apparatus 1 reduced in size, the cross-sectional area of the air channel 11 in the direction changing portion 50 not smaller than a surface area of the sucking surface 31a is achieved, and hence the blown air can be circulated in an entire area of the sucking surface 31a. The projecting wall 14 preferably includes a most projecting portion 14b whereof the amount projecting outward of the air channel 11 increased to be larger than the periphery thereof. With the provision of the most projecting portion 14b, the condensed water may be collected efficiently by the space (retaining portion) 51. FIG. 2 illustrates a mode in which the most projecting portion 14b is provided on the wall of the bottom portion of the direction changing portion 50 adjacent to the duct portion 40. However, the invention is not limited thereto.

Figure 3:
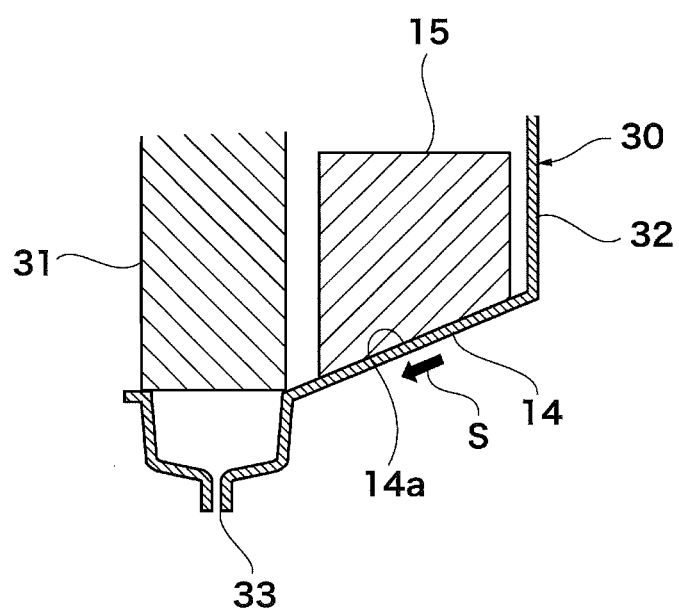
FIG. 3 is a drawing illustrating an end surface of FIG. 1 taken along a line Y-Y.

The space (retaining portion) 51 is a portion in which the condensed water dropped onto the direction changing portion 50 is temporarily stored, and the condensed water flowing into the space (retaining portion) 51 flows toward the drain port 33 illustrated in FIG. 3. The probability that the space 51 generates the whirl flow is reduced with decrease in capacity of the space or the amount of projection of the projecting wall 14. However, from the requirement from the vehicle layout, there is a case where the space 51 forcedly serves as a retaining portion for the condensed water like the vehicle air conditioning apparatus 1 illustrated in FIG. 1. In the case where the space 51 serves as the retaining portion, a predetermined amount of condensed water needs to be retained, so that there is a reason why the capacity of the space 51 or the amount of projection of the projecting wall 14 cannot be reduced. In this embodiment, even when the projecting wall of the projecting wall 14 is large, generation of the noise may be reduced by the provision of the projections 15 in the space (retaining portion) 51.

The projections 15 extend upward from the wall of the bottom portion of the direction changing portion 50. The projections 15 preferably extend in the vertical direction when the case 10 is mounted on the vehicle. Probability that the shape of the projections 15 is changed with time by the gravitational force may be reduced.

Preferably, in the vehicle air conditioning apparatus 1 of the embodiment, the projections 15 form a gap 52 with a supporting wall 17 configured to support the cooling heat exchanger 31 within the air channel 11. In the case where a lower portion of the cooling heat exchanger 31 is fixedly stored in a depression (not illustrated) formed on the case 10, and the supporting wall 17 is not provided, the projections 15 preferably forma gap with respect to the sucking surface 31a. The condensed water generated in the cooling heat exchanger 31 may be drained more efficiently. The projection 15 preferably includes a gap 53 between the opposed wall 32 and the projection 15. A flow channel for the condensed water is secured and an unintended retention of the condensed water is reduced.

FIG. 3 is a drawing illustrating an end surface of the FIG. 1 taken along a line Y-Y. In the vehicle air conditioning apparatus 1 of the embodiment, as illustrated in FIG. 3, the heat-exchanging portion 30 includes the drain port 33 configured to drain the condensed water from the case 10 on the bottom portion of a portion where the cooing heat exchanger is arranged, the projections 15 are plate-shaped projections, and a wall surface 14a on which the plate-shaped projection 15 is arranged preferably forms a downwardly inclined surface S directed toward the drain port 33. The condensed water generated in the cooling heat exchanger 31 may be drained more efficiently. When the case 10 is mounted on the vehicle, a downward inclined surface S directed toward the drain port 33 means a surface which is lowered in height with respect to the horizontal plane of the wall surface 14a as it goes toward the drain port 33.

Figure 4:
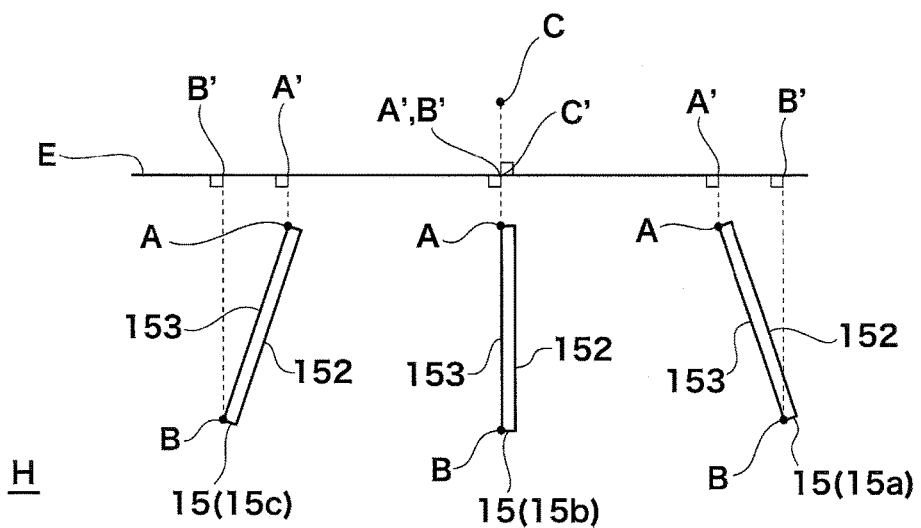
FIG. 4 is a drawing for explaining an example of arrangement of a plate-shaped projection.

FIG. 4 is a drawing for explaining an example of arrangement of the plate-shaped projection. Referring to FIG. 1 to FIG. 4, an example of arrangement of the plate-shaped projection will be described. FIG. 4 is a view viewing the plate-shaped projection 15 from above when the case 10 is mounted on the vehicle, and the paper plane corresponds to a horizontal plane H. As illustrated in FIG. 1, a surface closer to the cylindrical portion 12 from between front and back surfaces of the plate-shaped projection 15 is defined as a first plate surface 152, and a back surface of the first plate surface 152 is defined as a second plate surface 153. An end portion of an intersection line between the second plate surface 153 and the projecting wall 14 on the sucking surface 31a side of the plate-shaped projection 15 is defined as an end point 154 and an end point on the side of the plate-shaped projection 15 opposite from of the sucking surface 31a side is defined as an end point 155 (illustrated in FIG. 1). As illustrated in FIG. 4, a point projecting from the end point 154 onto a given horizontal plane H is defined as a point A, a point projecting from the end point 155 onto the horizontal plane H is defined as a point B, a point projecting from the drain port 33 (illustrated in FIG. 3) onto the horizontal plane H is defined as a point C, and points extending downward from the point A, the point B, and the point C onto an extended surface E of the sucking surface 31a (illustrated in FIG. 1) are defined respectively as a point A', a point B', and a point C'. At this time, the point A' is preferably located closer to the point C' than to the point B' like plate-shaped projections 15a and 15c illustrated in FIG. 4 or, alternatively, the points A', B', and C' overlap each other like a plate-shaped projection 15b illustrated in FIG. 4. In this arrangement, the condensed water flows efficiently along a base portion of the plate-shaped projection 15 toward the drain port 33, so that a drainage efficiency is enhanced.

A mode in which the vehicle air conditioning apparatus 1 is of the transverse-mounted type having a layout in which the blower unit and the heat exchanging portion are arranged in the lateral direction of the vehicle has been described. However, in this embodiment, the vehicle air conditioning apparatus 1 may be a vertically-mounted type having a layout in which the blower unit and the heat exchanging portion are arranged in the vertical direction of the vehicle. Since a burble occurs at an enlarged portion also in the vertically-mounted type, the projection may be provided at the enlarged portion. The vehicle air conditioning apparatus 1 of the transverse-mounted type having the projecting wall 14 projecting downward of the duct portion 40 has been described. However, the invention may be applied to a mode in which the projecting wall 40 projects upward of the duct portion 40.

EXAMPLES

Although the invention will be described further in detail on the basis of the examples, the invention is not limited to these examples.

Example 1

The vehicle air conditioning apparatus 1 illustrated in FIG. 1 is defined as Example 1.

Comparative Example 1

In the vehicle air conditioning apparatus 1 illustrated in FIG. 1, a vehicle air conditioning apparatus (not illustrated) which is not provided with the projections 15 is defined as Comparative Example 1.

CFD Analysis

Figure 5:
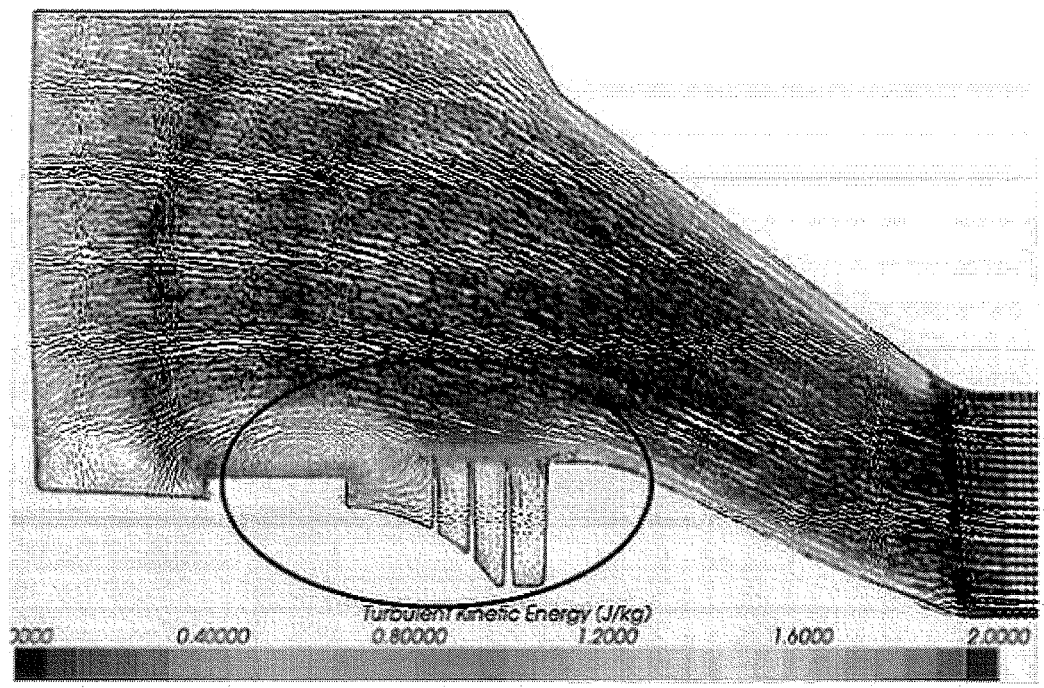
FIG. 5 is a result of a CFD analysis of Example 1.
Figure 6:
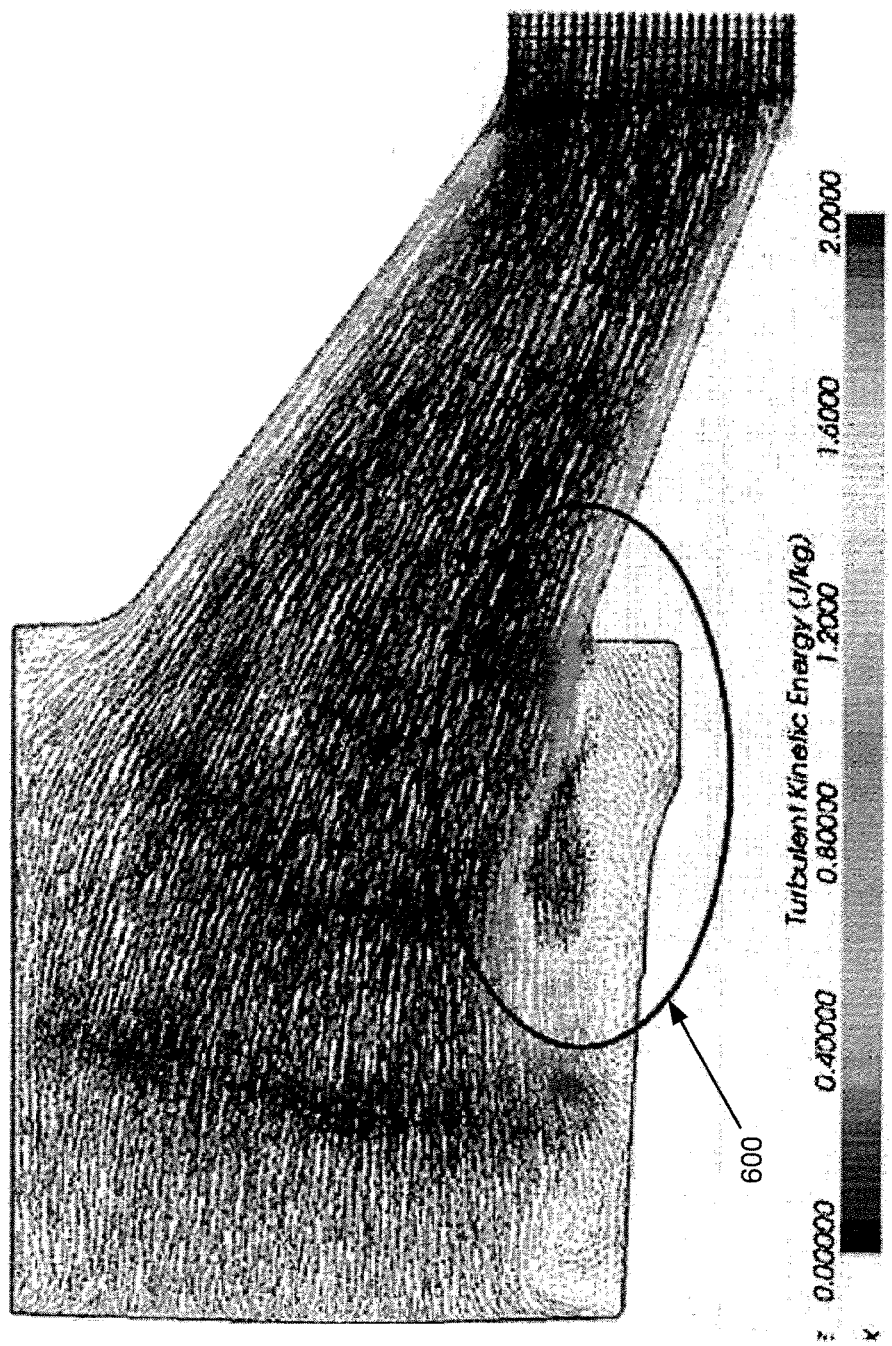
FIG. 6 is a result of a CFD analysis of Comparative Example 1.

A CFD analysis was conducted by using a CFD analysis software on the vehicle air conditioning apparatuses of Example and Comparative Example. Results of analysis will be illustrated in FIG. 5 and FIG. 6. In FIG. 5 and FIG. 6, images of a distribution of the kinetic energy processed into gray scale are shown. The distribution of kinetic energy is expressed further accurately by color images before being processed into the gray scale.

FIG. 5 is a result of a CFD analysis of Example 1. As illustrated in FIG. 5, in the vehicle air conditioning apparatus of Example 1, it was confirmed that a burble was prevented from forming a whirl flow by projections. In Example 1, the noise was reduced in comparison with Comparative Example 1.

FIG. 6 is a result of a CFD analysis of Comparative Example 1. As illustrated in FIG. 6, in the vehicle air conditioning apparatus of Comparative Example 1, it was confirmed that the kinetic energy was locally increased, and the burble (600) formed the whirl flow. Consequently, a noise was generated.

REFERENCE SIGN LIST 1 vehicle air conditioning apparatus
10 case
11 air channel
12 cylindrical portion
13 enlarged portion
14 projecting wall
14a wall surface on which plate-shaped projection is arranged
14b most projecting portion
15 projection (plate-shaped projection)
15a, 15b, 15c plate-shaped projection
16 virtual cylinder
17 supporting wall
17a notch
18 rectifying guide
19 shoulder
20 blower unit
21 blower
30 heat exchanging portion
31 cooling heat exchanger
31a sucking surface
32 opposed wall
33 drain port
40 duct portion
50 direction changing portion
51 space (retaining portion)
52, 53 gap
63 mold
151 top portion of projection
152 first plate surface
153 second plate surface
154 endpoint located on sucking surface side of plate-shaped projection
155 end point on opposite side of sucking surface of plate-shaped projection
L1 extended line of bus line
S downwardly inclined surface
H horizontal plane
E extended surface of sucking surface

What is claimed is:
1. A vehicle air conditioning apparatus comprising:
a case having an air channel in an interior thereof,
a blower configured to supply blown air to the air channel, wherein
the case includes a cylindrical portion and an enlarged portion continued from the cylindrical portion on a downstream side and having a cross-sectional area larger than a cross-sectional area of the cylindrical portion to form a burble of the blown air, the enlarged portion includes a projecting wall having a wall surface projecting outward of the air channel, the projecting wall includes at least one projection projecting inward of the air channel, and the at least one projection is configured to reduce, based on a top portion of the at least one projection coinciding a trajectory of extending an inner wall surface of the cylindrical portion toward the downstream, or being provided on the projecting wall side with respect to the trajectory, a noise caused by the burble.

2. The vehicle air conditioning apparatus according to claim 1, wherein the projections includes plate-shaped projections, a width direction of the plate-shaped projection corresponds to a direction intersecting a direction of an air flow.

3. The vehicle air conditioning apparatus according to claim 1, wherein the vehicle air conditioning apparatus has a layout in which a blower unit having the blower and a heat exchanging portion having a cooling heat exchanger are transversely arranged, the cylindrical portion is a duct portion provided between the blower unit and the heat exchanging portion, the cooling heat exchanger is arranged so that a direction of a normal line of a sucking surface intersects the direction of the flow of the blown air from the duct portion, the enlarged portion is a direction changing portion configured to change the direction of the flow of the blown air from the duct portion to a direction toward the sucking surface of the cooling heat exchanger, the projecting wall is a bottom wall of the direction changing portion, and a space is formed by the wall of the bottom portion projecting outward of the air channel, and the space is a retaining portion of condensed water generated in the cooling heat exchanger.

4. The vehicle air-conditioning apparatus according to claim 3, wherein the projection has a gap with respect to a supporting wall configured to support the sucking surface or the cooling heat exchanger in the air channel.

5. The vehicle air conditioning apparatus according to claim 3, wherein the heat exchanging portion includes a drain port configured to drain the condensed water from the case at a bottom portion in which the cooling heat exchanger is to be arranged, and the projections includes plate-shaped projections, and a wall surface on which the plate-shaped projections are arranged forms a downwardly inclined surface directed toward the drain port.

6. The vehicle air conditioning apparatus according to claim 5, wherein when a surface closer to the cylindrical portion out of front and back surfaces of the plate-shaped projections is defined as a first plate surface, the back surface of the first plate surface is defined as a second plate surface, a point formed by an end point of an intersecting line between the second plate surface and the inner surface of the projecting wall located on the sucking surface side of the plate-shaped projection by projecting on to a horizontal plane H is defined as a point A, a point formed by projecting an end point located on the opposite side of the sucking surface of the plate-shaped projection on to a horizontal plane H is defined as a point B, a point formed by projecting the drain port onto the horizontal plane His defined as a point C, and points extending downward from the point A, the point B, and the point C onto an extended surface of the sucking surface are defined respectively as a point A', a point B', and a point C', the point A' is closer to the point C' than to the point B', or the point A', the point B', and the point C' overlap each other.

* * * * *